(12) United States Patent
Hill

(10) Patent No.: US 7,093,255 B1
(45) Date of Patent: Aug. 15, 2006

(54) METHOD FOR ESTIMATING COST WHEN PLACING OPERATIONS WITHIN A MODULO SCHEDULER WHEN SCHEDULING FOR PROCESSORS WITH A LARGE NUMBER OF FUNCTION UNITS OR RECONFIGURABLE DATA PATHS

(75) Inventor: Ralph D. Hill, Los Gatos, CA (US)

(73) Assignee: QuickSilver Technology, Inc., San Jose, CA (US)

( * ) Notice: Subject to any disclaimer, the term of this patent is extended or adjusted under 35 U.S.C. 154(b) by 549 days.

(21) Appl. No.: 10/160,665

(22) Filed: May 31, 2002

(51) Int. Cl.
*G06F 9/46* (2006.01)

(52) U.S. Cl. .................... 718/102; 718/104

(58) Field of Classification Search .............. 718/100, 718/102, 103, 107, 104; 712/200, 203; 707/2, 707/3, 4, 5, 6; 717/161, 154, 15
See application file for complete search history.

(56) References Cited

U.S. PATENT DOCUMENTS

| | | | | |
|---|---|---|---|---|
| 5,202,993 | A * | 4/1993 | Tarsy et al. | 717/152 |
| 5,367,651 | A * | 11/1994 | Smith et al. | 717/149 |
| 5,367,687 | A * | 11/1994 | Tarsy et al. | 717/149 |
| 5,819,255 | A * | 10/1998 | Celis et al. | 707/2 |
| 5,889,989 | A * | 3/1999 | Robertazzi et al. | 718/105 |
| 6,446,258 | B1 * | 9/2002 | McKinsey et al. | 717/161 |
| 6,449,747 | B1 * | 9/2002 | Wuytack et al. | 716/2 |
| 6,718,541 | B1 * | 4/2004 | Ostanevich et al. | 717/149 |

OTHER PUBLICATIONS

Allan et al., "Software Pipelining," *ACM Computing Surveys*, vol. 27, No. 3, pp. 1-78, (Sep. 1995).
Callahan et al., "Adapting Software Pipelining for Reconfigurable Computing in Proceedings of the International Conference on Compilers, Architecture, and Synthesis for Embedded Systems." pp. 8, ACM, (CASES'00, Nov. 17-18, 2000, San Jose, CA).
Huff et al., "Lifetime-sensitive modulo scheduling," 6th *Conference on Programming Language, Design and Implementation*, pp. 258-267, ACM, (1993).
Llosa et al., "Lifetime—sensitive modulo scheduling in a production environment," *IEEE Trans. on Comps.*, vol. 50, No. 3, pp. 234-249, (Mar. 2001).

* cited by examiner

*Primary Examiner*—Meng-Al T. An
*Assistant Examiner*—Kenneth Tang
(74) *Attorney, Agent, or Firm*—Brian N. Young; Trellis Intellectual Property Law Group, PC

(57) ABSTRACT

A process for scheduling operations using a cost function is provided. A number of scheduling options are determined for an operation and a cost is computed for each scheduling option. The process then schedules the operation based on a computed cost.

26 Claims, 4 Drawing Sheets

| TIME | I/O 1 | ADDER 1 | I/O 2 | MULTIPLY 1 | SHIFTER 1 | ADDER 2 | ADDER 3 | MULTIPLY 2 | SHIFTER 2 | ADDER 4 | I/O 3 |
|---|---|---|---|---|---|---|---|---|---|---|---|
| 1 | READ A | | | | | | | | | | |
| 2 | | ADDA C, A, B | READ B | | | | | | | | |
| 3 | | | | MUL D, A, C | | | | | | | |
| 4 | | | | | RSH E, D, 16 | ADDB F, A, B | | | | | |
| 5 | | | | | | | | | | | |
| 6 | | | | | | | | | | | |

Fig. 4B

Consider the sequence of operations:

```
Read   a
Read   b
AddA   c, a, b
AddB   f, a, b
Mul    d, a, c
Rsh    e, d, 16
AddB   g, e, f
Write  g
```

Fig. 4A

METHOD FOR ESTIMATING COST WHEN PLACING OPERATIONS WITHIN A MODULO SCHEDULER WHEN SCHEDULING FOR PROCESSORS WITH A LARGE NUMBER OF FUNCTION UNITS OR RECONFIGURABLE DATA PATHS

BACKGROUND OF THE INVENTION

The present invention generally relates to computer processing and more specifically to instruction scheduling using a cost function.

Instruction scheduling involves assigning operations from an original sequence of operations to specific functional units at specific times in a way to make efficient use of hardware resources. The scheduled operations produce the same result as executing the operations sequentially in an original order but the operations may not be scheduled in that original order. The goal is to efficiently use hardware resources and retain the original result that would be obtained by executing the operations sequentially.

Instruction scheduling operates by scheduling an instruction that is executed for each clock cycle of a processor. Each instruction includes a slot for each functional unit of the processor where an operation may be scheduled. The instruction scheduler then schedules operations for functional units during a clock cycle. Typically, instruction schedulers attempt to schedule operations where a minimum number of instructions are used and operations are scheduled for as many functional units as possible in each instruction used.

The process of instruction scheduling orders operations in a scheduling order list, which is typically a list of operations in the order the operations should be executed if they were executed sequentially. Starting from the first ordered operation, the instruction scheduler determines the first functional unit earliest in time that may be able to execute the operation. When the first functional unit is found, the instruction scheduler schedules the instruction for that functional unit at that time. This process is repeated sequentially for each operation in the list.

The above approach may work when scheduling a small amount of functional units. However, when a large amount of functional units need to be scheduled for a given instruction or clock cycle, problems with the schedule result. For example, a resulting schedule may introduce delays in executing the operations, produce resource contention, and inefficiently use the resources.

Also, in one example, a resulting schedule is likely to result in excessive movement of data among function units. The excessive movement may result in delays in the execution of operations due to exhaustion of resources for data movement. The delays then increase the need for temporary data storage, which possibly exhausts data storage resources. In addition, the excessive data movement requires more time and power. Thus, the resulting schedule produces delays, uses resources inefficiently, and requires more power.

BRIEF SUMMARY OF THE INVENTION

In one embodiment of the present invention, a process for scheduling operations using a cost function is provided. A number of scheduling options are determined for an operation and a cost is computed for each scheduling option. The process then schedules the operation based on a computed cost.

In one embodiment, a method for scheduling an operation using a cost function is provided. The method comprises: identifying one or more scheduling options for the operation; determining a cost for scheduling the operation for each of the one or more scheduling options using the cost function; and scheduling the operation in a scheduling option of the one or more scheduling options based on the costs for the one or more scheduling options.

In another embodiment, computer program products stored on tangible media that direct an instruction scheduler as described below are provided.

A further understanding of the nature and advantages of the invention herein may be realized by reference of the remaining portions in the specifications and the attached drawings.

BRIEF DESCRIPTION OF THE DRAWINGS

FIG. 4A illustrates a sequence of operations that will be scheduled by instruction scheduler 102 in one example; and FIG. 4B illustrates a table showing the scheduled instructions in one embodiment.

DETAILED DESCRIPTION OF THE INVENTION

Figure 1:
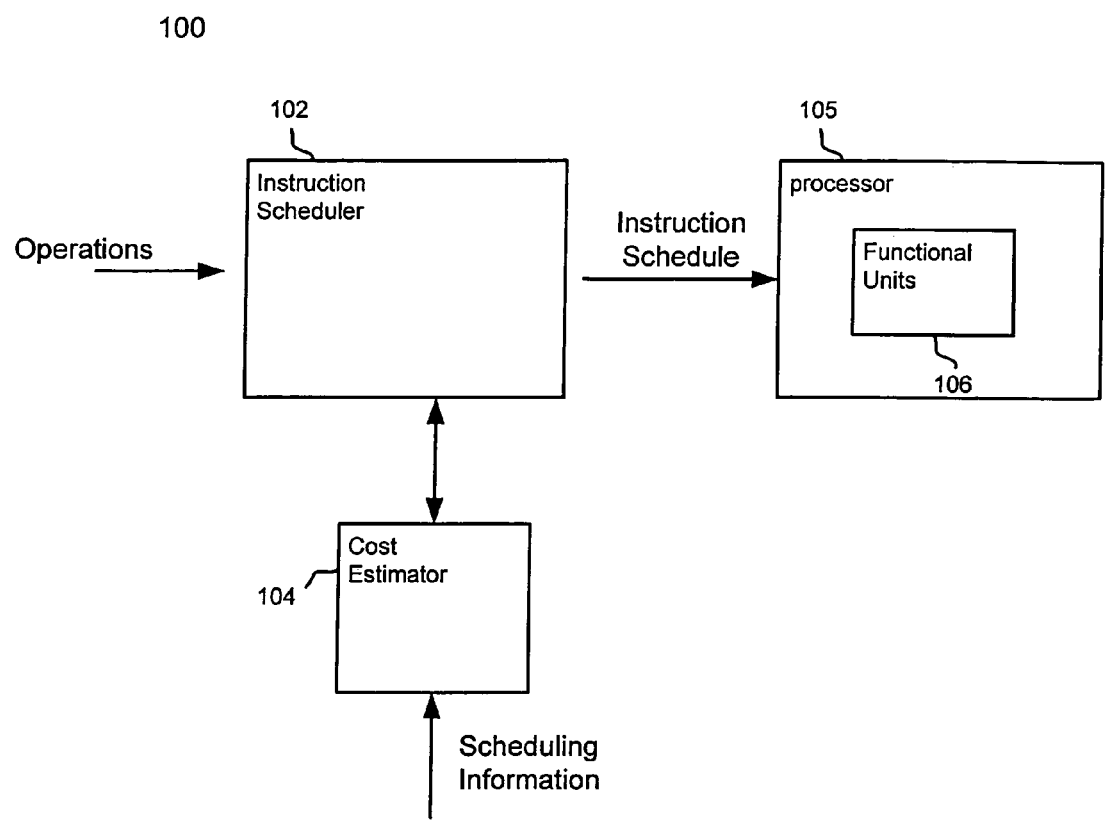
FIG. 1 illustrates a system for scheduling operations using a cost function according to one embodiment.

FIG. 1 illustrates a system 100 for scheduling operations using a cost function according to one embodiment. System 100 includes an instruction scheduler 102, a cost estimator 104, a processor 105, and functional units 106.

In one embodiment, processor 105 is a computer processor, such as a RaPiD processor developed by the University of Washington or an adaptable execution unit developed by QuickSilver Technology, Inc. Processor 105 may be included in a cellular phone, personal digital assistant (PDA), global positioning system (GPS) receiver, etc.

Functional units 106 are included in processor 105 and may include any unit capable of processing data. For example, functional units 106 include register files, arithmetic logic units (ALUs), multipliers, memory access units, etc. Typically, functional units 106 include one or two inputs and one output. However, it will be understood functional units 106 may include any number of inputs and outputs. Typically, the inputs and outputs of functional units 106 are interconnected by a data path or databus. Data is moved from functional unit to functional unit using the data path. In a specific embodiment, the number of functional units in functional units 106 is a large number, such as over one hundred functional units.

Instruction scheduler 102 is a computing device that schedules operations for execution on functional units 106. Examples of computing devices include personal computers, work stations, servers, personal digital assistants (PDAs), pocket PCs, and the like. In one embodiment, a computer program product including software code stored on a tangible medium that direct instruction scheduler 102 as described below is provided. Examples of tangible media include RAM, disk drives, floppy disks, CD-ROMs, flash memory, read only memories (ROMs), and the like.

Instruction scheduler 102 receives a list of operations from a program code and schedules the operations in instructions that are executed every clock cycle. After instructions are scheduled with the operations for the program code, the resulting instruction schedule is sent to processor 105. The instructions are then executed in processor 105 using functional units 106.

Instruction scheduler 102 interacts with cost estimator 104 to schedule the operations using a cost function. Cost estimator 104 estimates a cost of scheduling an operation. In one embodiment, cost estimator 104 may be implemented by software code stored on a computer readable medium in a computing device. In one embodiment, cost estimator 104 may be included in instruction scheduler 102 or be separate from instruction scheduler 102.

Cost estimator 104 includes a cost function that is used to estimate a cost for scheduling an operation for a scheduling option. In one embodiment, a scheduling option is an option for scheduling an operation for a specific functional unit in a specific clock cycle. Typically, an instruction scheduling table is used to illustrate scheduling options. The table includes slots corresponding to each functional unit 106 for every instruction and clock cycle. In the table, each slot may be thought of as a scheduling option. For a scheduling option, a cost is estimated using scheduling information that is collected by cost estimator 104 or sent to cost estimator 104 by instruction scheduler 102. In one embodiment, the scheduling information includes a description of the operation to be scheduled (e.g., opcode, input, and output), an indication of a target functional unit 106 and an indication of the target clock cycle (a scheduling option), the program code using the operation, and the current state of the schedule. Using any combination of the information, cost estimator 104 produces an output that is used by instruction scheduler 102 to schedule the operation. In one embodiment, the output may be a cost in the form of a number representing an estimate of the cost of scheduling the specified operation on the specified functional unit in the specified clock cycle, a description of any changes to the operation or program code to achieve the reported costs, and a data path to route the inputs and outputs for the operation. For example, cost estimator 104 may output a cost value and specify that a subtract operation be changed to a reverse subtract operation in order to achieve the outputted cost for the scheduling option. In one embodiment, a higher cost applies a greater inefficiency in the resulting schedule; however, it will be understood that any system of valuing costs may be used.

As mentioned above, a description of the operation to be scheduled may be used by the cost function in calculating the cost. In one embodiment, the cost function calculates an opcode, input, and output cost.

The opcode cost is the cost associated with the operation that is being performed. For example, the opcode cost for an operation A+B=C is the cost associated with performing the addition operation on a target functional unit (FU) 106. In one example, the opcode cost is determined by looking at target functional unit 106 and a list of operations target functional unit 106 is programmed to perform. Thus, if target functional unit 106 is programmed to perform the operation, the cost of performing that operation in target functional unit 106 will be lower. Also, if the operation is not in a list of operations that functional unit 106 is programmed to perform but the operation may be modified to be performed in functional unit 106, a higher cost may be assigned than in the first case. If functional unit 106 cannot perform the operation specified, the cost may be infinite or a very large number because functional unit 106 cannot perform that operation.

As mentioned above, the cost function may use any combination of an operation, a target functional unit, a target time slot T, the program code, and/or existing partial schedule to compute a cost. In one example, the cost function may be use the following analysis. If the target FU does not implement the operation, the cost function computes the cost as infinity. If the operation that is assigned to the target FU in time T+1 or T−1 is the same as the operation to be scheduled, the cost function calculates the cost as 0. If the target FU does not have any operations assigned to it in the current schedule, the cost function may calculate the cost using a table. For example, the table may include operations and the operations corresponding cost, e.g., the cost for operations X, Y, Z=1, and the cost for operations A, B, C=2.

Also, if the operation to be scheduled is not already assigned to a FU in any other time slot, then the cost may be calculated from a table that includes costs based on the number of operations already assigned to the target FU. For example, the cost calculated may be: for one operation already assigned, cost=1; two operations, cost=2; three operations, cost=4; four operations, cost=10; and five operations, cost=infinity.

The table may be two dimensional where the cost function depends on both the operation and the number of operations already assigned. Alternatively, the cost may be computed from two tables, one with cost based on operation and one based on cost for adding another operation. The values from these two tables are then combined with a function, such as multiplication to the determine the cost.

The input cost is the cost related to the inputs of the operation. For example, the input cost is the cost of inputting the data necessary to perform the operation into target functional unit 106. In one embodiment, the cost function computes the input cost using the cost of using the data path to transfer the data to the inputs of target functional unit 106, the cost of configuring switches that connect the data path to the functional unit, and the amount of delay that occurs from inputting the data to target functional unit 106, and the like. Thus, the input cost is an estimate of the resource consumption in setting configurable elements for inputting data to target functional unit 106. The input cost also may be affected by the existing schedule, the resources that are consumed, and the program code.

Using the above example, the variables A and B are the inputs for the operation. The input cost might be calculated by determining the cost to transfer A and B to a target functional unit for a scheduling option. The program code and/or existing schedule may be analyzed to determine where the inputs are coming from and a cost is calculated based on the analysis.

In one example, the cost function computes the input cost using any combination of information including target functional unit 106, the target time slot, the program code to be scheduled and the existing partial schedule. One possible input cost function will now be described.

If the operation that produces the input operation is not yet scheduled in the partial schedule, then the cost function determines the input cost using a table. The table may be based on target functional unit 106 and the type of operation that generates the input. The values in this table are dependent on the configuration of processor 105. For example, if a lot of data movement resources (e.g., multiple muxes, long wire runs) are needed to move from any functional unit 106 that can produce the input to target function unit 106, then the input cost in the table will be large.

If the operation that produces the input is already scheduled, then the cost function may consider moving the input through space (moving from the producing functional unit to the target functional unit) and moving the input through time (compensating for any difference in time between when the input is produced and the target time slot). If there is not enough time to get the input from functional unit 106 that produces the input to target functional unit 106 at the target time slot, then the input cost is infinite.

In order to calculate costs for space and time, candidate routes from a functional unit 106 that produces the input to target functional unit 106 are found. In one embodiment, every candidate route may be found; however, heuristics may be used to limit the search to realistic candidate routes. Also, the heuristic may only consider resources that are not already allocated within the existing partial schedule at the time that they will be needed to move the input. However, if a resource is already allocated to moving the input value (likely to some other functional unit 106) then the resource may be considered for inclusion in a path. Further, the cost of using the already allocated resource is 0.

The cost of each candidate route is estimated by adding up a cost estimate for each resource that is used but not shared. The resources may include wires, muxes, pipeline registers, shift registers, and the like. If a resource (such as a register) is used for more than one clock cycle the cost for using the resource may take into account the amount of time the resource is used. The cost estimate for using some resources might also be reduced based on the existing partial schedule. For example, if the route makes use of a mux, where the mux setting for the route will be the same as the mux setting for the route that uses the mux in the next or previous clock cycle, then the cost of using the mux may be reduced. This is because there may be a power or control savings as a result of not changing the mux setting.

After costs are calculated for each candidate route, the input cost is the cost of the candidate route with lowest cost. Additionally, the information needed to construct the selected candidate route with the lowest cost is stored and will be needed when scheduling the operation.

The output cost is related to the outputs of the operation. For example, the output cost is the cost of assigning the output of the operation to a specific functional unit 106 that is going to use the output. In one embodiment, the output cost is calculated using the output, a target functional unit 106, a target time slot, the existing schedule, the resources that are consumed by the outputs, and the program code. Using the above example, the output of the operation is the variable C. The output cost for C may be determined by analyzing the program code and existing schedule to determine which functional unit 106 is going to receive C.

In one example, the output cost of an operation is the sum of the costs of moving the output through space and time to each of functional units 106 that need the output. Each of the component costs in the sum may be computed using techniques similar to computing the input cost. In this case, possible candidate routes are found and the cost of using resources in the routes is calculated. Also, there may be multiple destinations for an output. In this case, a cost is calculated for each destination. If two or more candidate routes share resources for multiple destinations, the cost may be adjusted so that the shared resources are only counted once.

One example for calculating the cost of moving the output from the originating functional unit to the consuming functional unit is described below. In this example, it is assumed that all the destination operations have already been placed in the schedule. Assuming n destinations for the output, $D_1$, $D_2, \ldots D_n$, the cost function finds all practical routes from the originating functional unit to each destination using techniques similar to those used in finding routes for calculating input cost. Assuming there are $d_i$ routes from the originating node to $D_i$, and they are named $r_{i1}, r_{i2}, \ldots, r_{id_n}$, the cost function computes $d_1 * d_2 * d_3 * \ldots * d_n$ route combinations and costs. The route combinations are every possible combination of routes choosing one route from the originating node to each destination. Each route combination consists of n routes. For each route combination, the cost function computes the sum of the costs of each route. If a resource is used in more than one route in a route combination, then the cost of that resource is counted only once in computing the cost of the route combination. The cost of each resource may computed as described in the computation of the input cost.

The output cost is the cost of the route combination with the lowest cost. Also, the route combination is stored and used to schedule the operation.

If there are destination operations that have not been placed in the schedule, the destinations may be removed from the list of destinations, and the cost computed as described above. Then, for each destination operation that has not been placed, a cost from a table may be added to the cost computed above. In one embodiment, the table has a cost estimate for each combination of a source functional unit and destination operation type. The cost in the table may be based on the cost of typical routes from the source functional unit to functional units that support the destination operation type.

Cost estimator 104 estimates a final cost for scheduling the operation in the scheduling option from the computed opcode cost, input cost, output cost, and other factors. In one embodiment, the opcode cost, input cost, and output cost are added together to obtain a final cost for scheduling the operation in a scheduling option. Also, cost estimator 104 may make a change to the operation and compute the opcode cost, input cost, and output cost for the changed operation. The process of changing the operation and re-computing the cost may be repeated any number of times. Once determining the final cost for the inputted operation and cost estimates for any changed operations, the smallest cost is selected and outputted to instruction scheduler 102. If the cost is for a changed operation, the change to the operation is also outputted. Additionally, the route associated with the operation with lowest cost is outputted.

Also, all the costs may be outputted to instruction scheduler 102. For example, the costs of the original operations and the changed operations with their associated costs may be outputted to instruction scheduler 102. Then, instruction scheduler 102 determines which operation to schedule based on all the costs.

In one embodiment, instruction scheduler 102 estimates costs for every possible scheduling option for an operation. If a processor includes numerous functional units, then the number of possible scheduling options may be very large. Thus, it may be unreasonable to estimate the costs of every single scheduling option. A heuristic is included in instruction scheduler 102 that determines viable scheduling options for a specific operation out of the possible scheduling options. For example, instruction scheduler 102 may include parameters that are used to find possible viable scheduling options. The heuristic may determine where the last operation was scheduled in the existing schedule and a parameter will specify viable scheduling options in relation to the last operation scheduled. For example, using an instance of an instruction scheduling table, the parameters may include the five functional units to the right of the last functional unit scheduled, one functional unit to the left of the functional unit last scheduled, and three clock cycles forward in time. Once the possible scheduling options are determined, each option is sent to cost estimator 104 along with the other input information.

Figure 2:
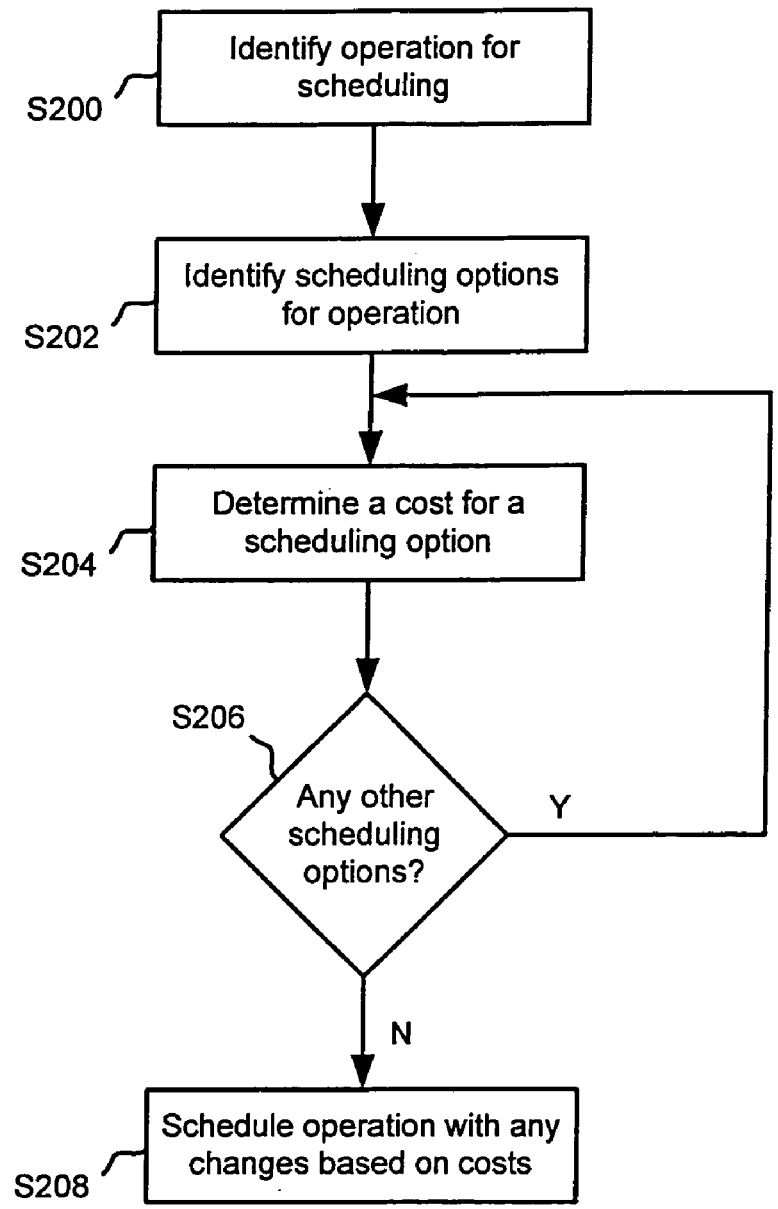
FIG. 2 illustrates a method for scheduling a plurality of options using a cost function according to one embodiment.

FIG. 2 illustrates a method for scheduling a plurality of options using a cost function according to one embodiment. In step S200, an operation for scheduling is identified from a list of ordered operations to be scheduled. In step S202, one or more scheduling options are identified for the identified operation. In one embodiment, a heuristic determines viable scheduling options from possible scheduling options.

In step S204, a cost for scheduling the operation for a scheduling option is determined using the cost function. Also, the cost function determines any changes to the operation for the cost and routes for the inputs and outputs of the operation. For example, the scheduling option, which indicates a target functional unit and a target clock cycle where the operation may be scheduled, is sent to cost estimator 104. Additionally, the operation, a program code, and current schedule may be sent to cost estimator 104, which uses the cost function to output a cost and any required changes to the operation to achieve the cost.

In step S206, the method determines if any other scheduling options need cost calculations. If there are scheduling options that have not been processed, the method reiterates to step S204 where a cost for another scheduling option is determined for the operation. This process is repeated until a cost is calculated for each scheduling option.

In step S208, if no other scheduling options need to be processed, the operation, along with any required changes, is scheduled based on the costs for the one or more scheduling options. In one embodiment, the lowest cost out of all the scheduling options is chosen and the operation is scheduled in that scheduling option.

Figure 3:
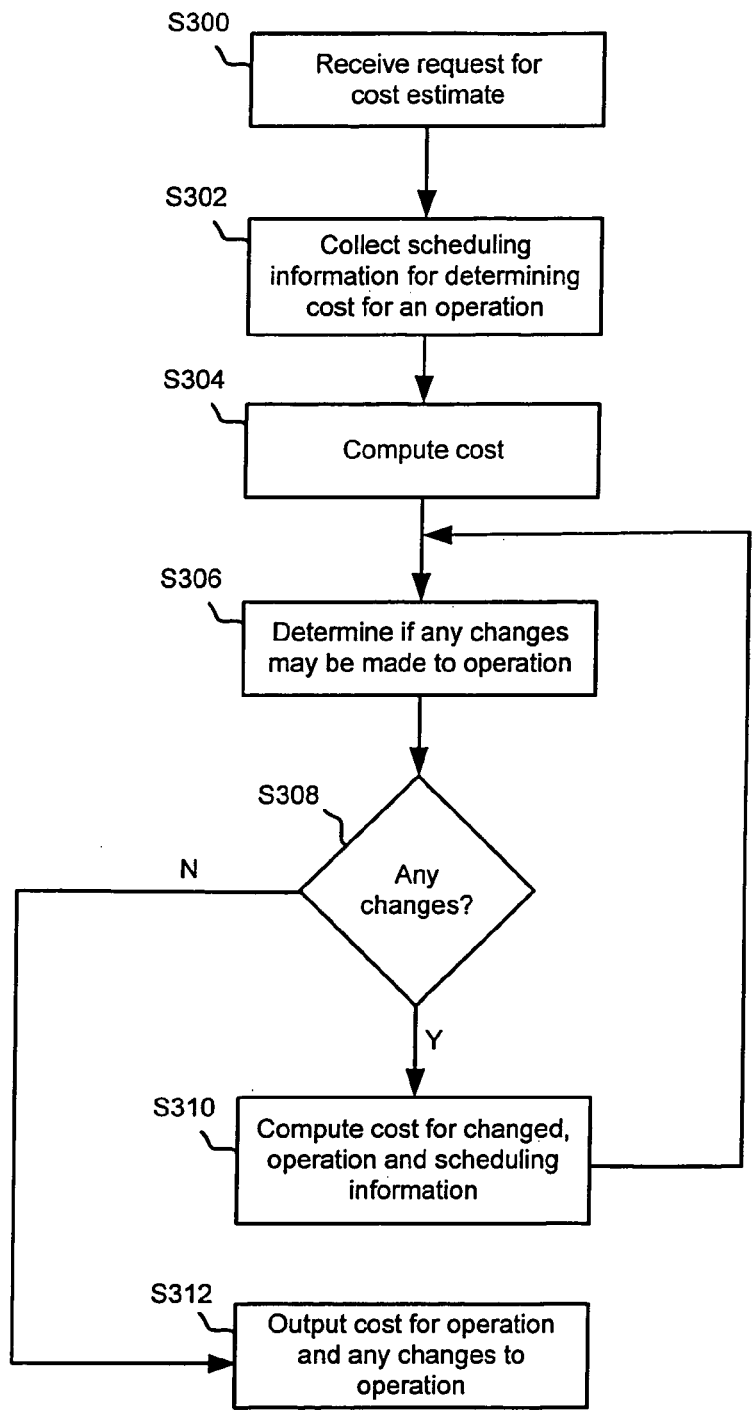
FIG. 3 illustrates a method for computing a cost function according to one embodiment.

FIG. 3 illustrates a method for determining a cost for a scheduling option according to one embodiment. In step S300, cost estimator 104 receives a cost estimate request for an operation and a scheduling option. In step S302, scheduling information for determining an operation's cost is collected.

In step S304, cost estimator 104 computes a cost. In one embodiment, an opcode, input, and output cost are calculated to determine the cost.

In step S306, it is determined if any changes to the operation may be made. If there are changes (step S308), the method proceeds to step S310, where a cost is computed for the changed operation using the scheduling information. The method then reiterates to step S306 where it is determined if any other changes to the operation may be made.

If there are no changes, a cost for the operation and any changes to the operation is outputted, and routes for the inputs and outputs (step S312).

Embodiments of the present invention provide a cost function that is used in scheduling operations. Scheduling resources based on a cost function allows for efficient use of resources. Additionally, when a processor includes a large number of functional units, calculating a cost allows the efficient scheduling of functional units.

An example of scheduling instructions using a cost function according to one embodiment will now be described. In one embodiment, cost estimator 104 estimates the cost for each scheduling option. FIG. 4A illustrates a sequence of operations that will be scheduled by instruction scheduler 102. FIG. 4B illustrates a table showing the scheduled instructions. The first row of the table includes a simplified list of functional units 106. The order of the columns in the first row correspond to the physical locations of the functional unit 106. Although eleven functional units are shown, it will be understood that any number of functional units may be used. Rows 2–7 represent instructions in clock cycles 1–6 that are executed by processor 105. As shown, read A has been scheduled in I/O 1; ADDA C, A, B has been scheduled in ADDER 1, READB has been scheduled in I/O 2; MUL D, A, C has been scheduled in MULTIPLY 1; RSM E, D, 16 has been scheduled in SHIFTER 1; and ADDB F, A, D has been scheduled in ADDER 2.

For this example, the costs of scheduling the operation "ADDB G, E, F" is calculated. First, the possible scheduling options are chosen for the operation. In one embodiment, four scheduling options for the four adders in clock cycle 5 are determined. Thus, ADDER1, ADDER2, ADDER3, and ADDER4 in clock cycle 5 are possible locations where the operation may be scheduled. In this case, the scheduling options are determined because the operation is dependent on the shift operation started in clock cycle 4 and thus the earliest time this operation can begin is clock cycle 5.

The following are the cost functions that will be used for this example. However, it will be understood that other cost functions may be used and embodiments of the present invention are not limited to the cost functions described below. The functions used for this example are an operation cost, and input cost, and output cost.

For the operation cost, if an operation is repeated on the same functional unit, the cost is zero. For example, if the two ADDB operations in FIG. 4A are placed on the same adder, then the operation cost for the first to be scheduled is 10 and the operation costs for the second operation is zero. Additionally, if a functional unit can perform the operation, the operation cost is 10. If the functional unit cannot perform the operation, the cost is infinity.

The input cost is calculated based on distance and time. For example, using the table in FIG. 4B, the cost to move an input backwards one column is 10. The cost to move an input forward one column is 5. Moving one column in the table may be thought of as physically moving one functional unit away. Additionally, a penalty for moving 5 or more columns may be assessed that is 100. Also, the cost of moving an input through one unit of time is 20. These input costs are calculated from a reference point, which is the point in the table where the input is received. If the source for a target is not known because the corresponding operation is not yet scheduled, cost estimates for all likely schedulings for the source operation are calculated and an average is used for the cost.

The output cost is calculated similarly to the input cost. However, the output cost is determined using the number of columns from the source of the output to the destination the output must travel to.

The cost calculation for ADDER1 at clock cycle 5 will now be described.

The operation cost is calculated as 10. ADDER1 is already used in clock cycle 2 but the adder is used for a different type of add instruction, ADDA. The operation cost is therefore 10.

The input cost is calculated as 110. The inputs for the ADDB operation are E and F. The value F must travel backwards four columns and be stored for two clock cycles. Thus, the calculated cost is 80 (four columns backwards at 10 per column and two clock cycles at 20 per clock cycle). The value of the input E must travel backwards three columns but does not need to be stored. The cost for E is thus 30. The input cost is therefore 80+30=110.

The output cost is calculated as 145. The ADDB operation has one output, G. The output G must go to a functional unit where a write operation can be performed. Because I/O1 and I/O2 are already doing reads in this program, they cannot also do write commands. I/O3 can do a write command and is chosen. I/O3 is nine columns away from ADDER1 and the cost is calculated as 45 (9 columns at 5 per column). Additionally, a penalty of 100 is assessed for traveling more than five columns. Thus, the output cost is calculated as 45+100=145.

The total cost for ADDER1 is the sum of the operation cost, input cost, and output cost. Thus, the total cost is thus 265.

The cost calculation for ADDER2 in clock cycle 5 will now be described.

The operation cost is zero for this operation. ADDER2 already performs an ADDB in this program and thus the cost to perform the operation is zero.

The input cost is 45. The input E must travel one column forward and has a cost of 5 (1 column forward at 5 per column). The input F is in the same column but must be stored for two clock cycles. The cost for input F is 40 (2 clock cycles at 20 per clock cycle). The total input cost is thus 5+40=45.

The output cost is 125. The output G must travel to I/O3, which is five columns forward from ADDER2. Thus, the cost is 25 (5 columns forward at 5 per column) plus a penalty of 100 for moving five or more columns.

The total cost for ADDER2 at clock cycle 5 is 0+45+125=170.

The cost for ADDER3 at clock cycle 5 will now be described.

The operation cost is 10 for the operation. ADDER3 does not perform any operations in this program and can perform the add operation. Thus, the operation cost is 10.

The input cost is 55 for this operation. The input E must travel one column forward and the cost is 5. Additionally the input F is in the same column and must be stored for two clock cycles for a cost of 40. Thus, the input cost is 5+40=45.

The output cost is 20. The output G must travel forward four columns from the ADDER3 column for a cost of 20 (4 columns at 5 per column).

The total cost for ADDER3 is thus 10+55+20=85.

The cost calculation for ADDER4 at clock cycle 5 will now be described.

The operation cost is 10 for this operation. ADDER4 does not perform any other operations in this program and can perform the add operation.

The input cost is 185 for this operation. Input E must travel five columns forward for a cost of 25 (5 columns at 5 per column). A penalty of 100 for traveling five or more columns is also assessed. Thus, the cost for input E is 125. The input F must travel four columns forward and be stored for two clock cycles. Thus, the cost for input F is 20+40=60. The input cost is therefore 125+60=185.

The output cost is five for this operation. The output G must travel one column forward from ADDER4. Thus, the output cost is calculated as 5.

The total cost for ADDER4 is 10+185+5=200.

Once cost estimator 104 estimates the cost for each of the scheduling options, the lowest cost for scheduling the option is chosen. In this example, the operation ADD B, G, E, F is scheduled in ADDER3 at clock cycle 5 at a cost of 85.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for scheduling an operation, wherein the operation is scheduled for execution by a system having a plurality of functional units interconnected by reconfigurable data routes, the method comprising:
   identifying one or more scheduling options for the operation;
   determining a cost for scheduling the operation for each of the one or more scheduling options by using a cost function that includes a cost for configuring a data route, wherein the data route includes a particular functional unit that will perform at least part of the operation; and
   scheduling the operation based on the costs for the one or more scheduling options.

2. The method of claim 1, further comprising scheduling a plurality of operations using the cost function.

3. The method of claim 1, wherein the cost function comprises an opcode cost.

4. The method of claim 1, wherein the cost function comprises an input cost.

5. The method of claim 1, wherein the cost function comprises an output cost.

6. The method of claim 1, further comprising determining a change to the operation.

7. The method of claim 6, further comprising determining a cost for scheduling the changed operation for one or more scheduling options by using the cost function.

8. The method of claim 7, further comprising
   scheduling the operation with the change to the operation.

9. The method of claim 1, wherein identifying one or more scheduling options comprises identifying the one or more scheduling options based on a heuristic that determines the one or more scheduling options out of a group of possible scheduling options.

10. The method of claim 1, wherein scheduling the operation comprises:
    scheduling the current operation with a lowest cost.

11. The method of claim 1, further comprising:
    determining candidate routes for an input to the particular functional unit;
    assigning a cost to each candidate route; and
    using at least one of the assigned costs in determining a cost for scheduling the operation.

12. The method of claim 11, wherein assigning a cost to each candidate route includes:
    increasing cost estimates for each resource used by the candidate route that is not shared by other candidate routes.

13. A method for computing one or more costs for scheduling an operation in one or more scheduling options using a cost function, wherein the operation is scheduled for execution by a system having a plurality of functional units interconnected by reconfigurable data routes, the method comprising:
    (a) collecting information related to scheduling the operation for a scheduling option in the one or more scheduling options;
    (b) computing a cost for scheduling the operation by using a cost function that includes a cost for configuring a data route, wherein the data route includes a particular functional unit that will perform at least part of the operation;

(c) outputting the cost of the scheduling option; and
(d) performing steps (a)–(c) for each of the one or more scheduling options.

14. The method of claim 13, further comprising computing a cost for each of a plurality of operations using the cost function.

15. The method of claim 14, wherein the collecting information comprises collecting at least one of opcode information, input information, output information, target clock cycle information, target functional unit information, program information, and current schedule information.

16. The method of claim 13, further comprising determining a change to the operation.

17. The method of claim 16, further comprising:
collecting information related to scheduling the changed operation for the scheduling options; and
computing a cost for the scheduling options using the cost function and the changed scheduling option's information.

18. The method of claim 17, further comprising outputting the change to the operation.

19. The method of claim 13, further comprising:
determining candidate routes for an input to the particular functional unit;
assigning a cost to each candidate route; and
using at least one of the assigned costs in determining a cost for scheduling the operation.

20. The method of claim 19, further comprising:
increasing cost estimates for each resource used by the candidate route that is not shared by other candidate routes.

21. A method for scheduling an operation using a cost function and an instance of an instruction scheduling table, wherein the operation is scheduled for execution by a system having a plurality of functional units interconnected by reconfigurable data routes, the method comprising:
identifying one or more scheduling slots for the operation in the instance of the instruction scheduling table;
determining a cost for scheduling the operation for each of the one or more scheduling slots using the cost function by using a cost function that includes a cost for configuring a data route, wherein the data route includes a particular functional unit that will perform at least part of the operation;
scheduling the operation in a scheduling slot of the one or more scheduling options based on the costs for the one or more scheduling options.

22. The method of claim 12, wherein a resource includes a wire.

23. The method of claim 12, wherein a resource includes a multiplexer.

24. The method of claim 12, wherein a resource includes a register.

25. The method of claim 12, further comprising:
determining an amount of time that a candidate route will use a resource.

26. The method of claim 25, further comprising:
taking into account whether a candidate route's use of a resource during a particular clock cycle requires a change of setting in the resource.

* * * * *